Nov. 18, 1969   R. A. RAASCH   3,478,980
ROLLER FOR TRUCK COVER
Filed Sept. 13, 1968
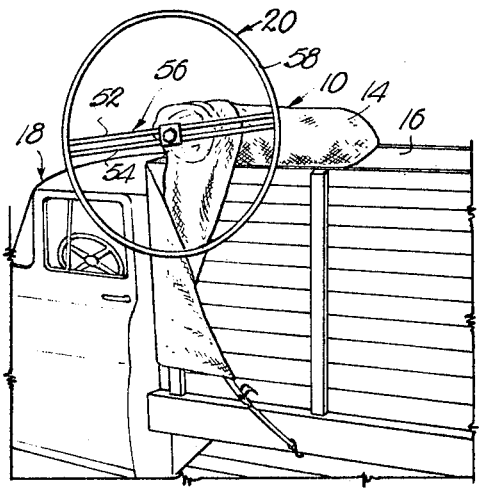
Fig. 1.
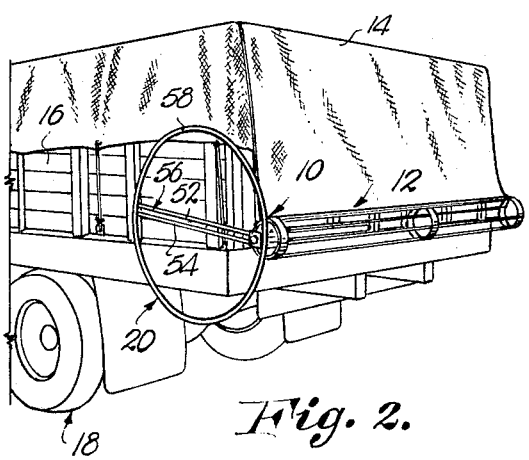
Fig. 2.
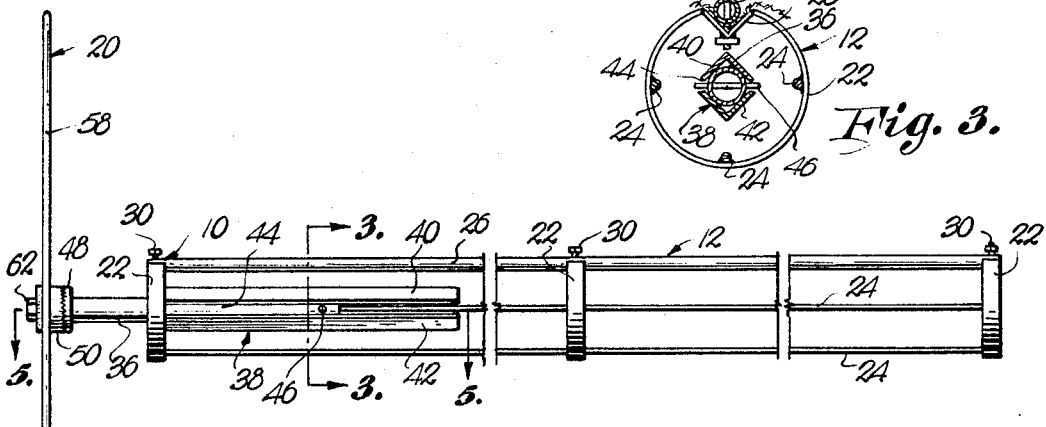
Fig. 3.
Fig. 4.
Fig. 5.
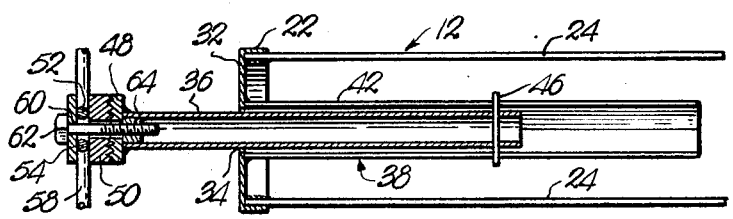
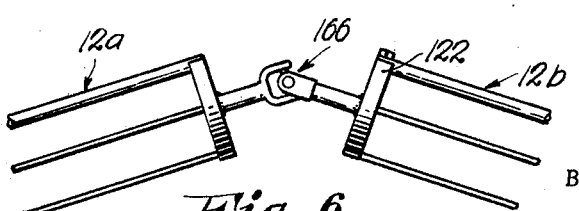
Fig. 6.
INVENTOR
Robert A. Raasch
BY Schmidt, Johnson, Hovey,
Williams & Bradley
ATTORNEYS United States Patent Office 3,478,980
Patented Nov. 18, 1969

3,478,980
ROLLER FOR TRUCK COVER
Robert A. Raasch, Rte. 3, Norborne, Mo. 64668
Filed Sept. 13, 1968, Ser. No. 759,581
Int. Cl. B65h 75/20
U.S. Cl. 242—86.52
8 Claims

ABSTRACT OF THE DISCLOSURE

Apparatus for wrapping a flexible cover for a body such as a truck bed, including an elongated, rigid skeletal spool and a handle comprising a wheel of greater diameter than the spool. The wheel is secured at one end of the spool by relatively telescoping members to permit outward shifting of the handle. The wheel includes a spoke extending along the diameter of the wheel and releasable clamping means securing the spoke to the telescoping members so that the wheel may be shifted in any direction radially of the spool.

---

This invention relates to covers, and more particularly, to apparatus for wrapping a cover such as a truck tarpaulin to remove the cover from the body or to extend the cover across the body. It has long been a widespread practice to secure an elongated, rigid rib to one edge of a flexible cover of this type to facilitate the rolling of the cover from its edge when it is desired to remove the cover from its extended position. Once rolled, the assembly can be quickly and easily unrolled across the body to cover the latter.

Various devices could be used for manually manipulating the rib or spool to roll the flexible cover. These might include a handle rigidly secured at one end of the rib to increase the mechanical advantage for the operator in rolling the relatively heavy tarpaulin. One disadvantage with such construction however, is that the handle tends to cause a bunching of the adjacent end of the tarpaulin when it is rolled onto the rib. A further disadvantage is that the handle either projects from the truck bed or body to create a hazard or, on the other hand, the handle is so closely positioned adjacent the body that it hampers manual manipulation of the device. Further, the projecting of the handle rearwardly from the rib or spool is an additional hazard.

Accordingly, it is the primary object of this invention to provide apparatus for manually wrapping a flexible cover, which apparatus includes a handle in the nature of a wheel and means for permitting manual shifting of the wheel into and out of its operating position whereby the wheel is stored in an out-of-the-way position when not in use.

Another object of the invention is to provide novel clamping structure between the wheel and the spool so that the wheel may be shifted to the out-of-the-way position irrespective of the precise location of the spool.

Still a further object of the invention is to provide wrapping apparatus which is configured to permit maximum circulation of the air for drying the cover when wrapped thereon and which also minimizes the weight of the apparatus.

Still another object of the invention is to provide novel cover wrapping apparatus which may be relatively economically fabricated from readily available structural materials thereby reducing the expense of the apparatus.

These and other important objects of the invention will become apparent or will be further explained hereinafter.

In the drawing:

FIGURE 1 is a fragmentary perspective view of the wrapping apparatus embodying the principles of this invention, illustrating the same installed on a truck;

FIG. 2 is a view similar to FIG. 1 but illustrating the rear of the truck and showing the apparatus in its position with the cover extended across the truck bed;

FIG. 3 is a cross-sectional view taken along line 3—3 of FIG. 4;

FIG. 4 is a fragmentary, side elevational view of the wrapping apparatus;

FIG. 5 is a fragmentary, cross-sectional view taken along line 5—5 of FIG. 4; and FIG. 6 is a fragmentary, side elevational view of the connecting joint of a modified form of the apparatus.

Apparatus embodying the principles of this invention is broadly designated by the reference numeral 10 and includes a spool 12 adapted to be secured to one edge of a flexible cover 14 which may comprise a tarpaulin for covering a body such as the bed 16 of a truck 18. A handle 20 is provided for rotating spool 12 on its longitudinal axis to wrap the cover 14 into a roll as illustrated in FIG. 1.

Spool 12 includes a plurality of generally circular bands 22 spaced longitudinally of spool 12 and interconnected by a plurality of elongated, rigid bars 24 spaced circumferentially of bands 22 and rigidly secured to the latter to provide an elongated, open skeletal framework comprising the spool 12. An angle iron 26 is rigidly secured to bands 22 as illustrated in FIG. 3 to provide an elongated trough running the entire length of spool 12. The proximal edge of tarpaulin 14 is clamped between iron 26 and an elongated, rigid element, such as a pipe 28. A plurality of bolts 30 at spaced intervals along spool 12 secure pipe 28 to angle iron 26 with the tarpaulin sandwiched therebetween.

One end band 22 has a covering disc 32 secured thereto. The latter is provided with an axial opening 34 which receives an elongated, tubular member 36 which is relatively telescoped within a member 38 disposed axially within spool 12. Member 38 comprises a pair of opposed, elongated, rigid elements such as angles 40 and 42. The proximal ends of angles 40 and 42 are welded to disc 32 so that the latter extend in cantilevered fashion into spool 12. The angles 40 and 42 are spaced apart to define an elongated slot 44 which receives a projection in the nature of a pin 46 carried by member 36 transversely of the latter and projecting outwardly therefrom as illustrated best in FIG. 5. It will thus be seen that members 36 and 38 are prevented by pin 46 from relative rotation. On the other hand, pin 46 may move in slot 44 to permit relative telescoping of the members. The angles 40 and 42 are disposed to frictionally engage the outer surface of member 36 to prevent inadvertent relative telescoping of the members.

The outermost end of member 36 is rigidly secured to a plate 48 having a roughened outer surface which complementally engages a plate 50 abutting a pair of elongated, parallel rods 52 and 54 forming a spoke 56 extending across the diameter of handle 20. The latter is in the form of a wheel which includes an annular rim 58 rigidly secured to spoke 56. A disc 60 embraces the opposite side of rods 52 and 54 from that engaging plate 50, and a bolt 62 passes through axial openings in plates 48 and 50 and is threadably received in a nut 64 located within tubular member 36. Accordingly, it will be readily appreciated that plates 48 and 50 present clamp components which may be selectively rotated relative to one another. Further, plate 50 and disc 60 provide clamping components which may selectively permit relative shifting of rods 50 and 54 with respect to member 36.

In operation, handle 20 is pulled axially of spool 12 to shift the handle in outwardly spaced relationship from the proximal end of spool 12. This clears the handle so that the operator may manipulate the roller apparatus without fear of skinning his knuckles against the body. Further, the proximal overlapping side of the flexible cover has ample room for extending beyond spool 12 without interfering with the handle. Manifestly, the wrapping operation is carried out with the rim 58 disposed concentric with the outer surface of spool 12.

When the assembly is in the rolled position as illustrated in FIG. 1, it may be desirable to shift the handle rearwardly of the truck so that the handle does not interfere with the opening of the cab door and the like. The operator merely loosens bolt 62 to rotate spoke 56 to the direction of desired movement of the handle. The operator may then shift the handle by sliding the rods 52 and 54 between plate 50 and disc 60 to the desired position for handle 20. The operator may retighten bolt 62 to clamp the assembly in its standby position.

When it is desired to extend the cover, the operator loosens bolt 62, slides rods 52 and 54 to a position with the rim 58 concentric with the spool. The bolt is retightened so that the operator may manually unroll the cover to the position shown in FIG. 2. The operator loosens bolt 62 and relatively rotates plates 48 and 50 so that the spoke 56 is extending in the desired direction of movement of handle 20. The operator then slides the rods 52 and 54 between plate 50 and disc 60 as previously described to move the handle to the position illustrated in FIG. 2 where it does not project substantially rearwardly of the truck. The bolt is then retightened and member 36 is telescoped within member 38 to shift the handle 20 inwardly against the truck for standby until it is again necessary to roll the cover.

Referring now to FIG. 6, a universal joint 166 may be provided intermediate bands 122 to accommodate truck bodies having a ridgepole. It will be readily appreciated that the pole is received between the bands 122 and the angle of the spool sections 12a and 12b is such as to permit the spool sections to roll on the upper edges of the truck body. Otherwise, the apparatus illustrated in FIG. 6 may be identical with that previously described.

Having thus described the invention, what is claimed as new and desired to be secured by Letters Patent is:

1. Apparatus for wrapping a flexible cover for a body comprising:
   an elongated spool adapted to be secured to said cover;
   a manually manipulable handle; and
   means securing said handle to the spool for rolling the spool upon manipulation of the handle, said securing means including a first member rigidly secured to the spool adjacent one end of the latter, a second member rigidly secured to the handle, said members being disposed for relative telescoping movement axially of the spool, and means locking said members against relative rotation while permitting said relative telescoping movement whereby said handle may be shifted axially of the spool toward and away from a standby position adjacent the proximal end of the spool.

2. The invention of claim 1, wherein said first member extends axially into the proximal end of said pool, and wherein said first member is configured to frictionally embrace the outer surface of said second member to prevent inadvertent relative shifting of said members.

3. The invention of claim 1, wherein said first member includes a pair of elongated, rigid, spaced-apart elements defining an elongated slot therebetween and extending parallel with the axis of said spool, said locking means including a projection carried by said second member and extending into said slot.

4. The invention of claim 3, wherein said projection includes a pin extending transversely of the said second member.

5. The invention of claim 1, wherein said handle includes a wheel having an annular rim, said rim being of greater diameter than the diameter of said spool to enhance the mechanical advantage of said handle.

6. The invention of claim 1, wherein said spool includes a plurality of bands disposed transversely of the spool and spaced axially of the latter, and a plurality of elongated, rigid bars spaced circumferentially of the bands and secured to the latter to provide an open, skeleton framework whereby to maximize the circulation of air for drying the cover and to minimize weight of the spool.

7. The invention of claim 5, wherein is included a spoke for said wheel, said spoke extending across the diameter of said wheel, and clamp means engageable with the spoke and said second member for releasably securing said second member to said spoke at any selected position along the latter, whereby to permit relative shifting of the handle radially of the spool.

8. The invention of claim 7, wherein said clamp means includes a pair of relatively rotatable components, one of said components being carried by said second member, the other component engaging said spoke, and means releasably securing said components in any predetermined, relatively rotated position.

References Cited

UNITED STATES PATENTS

| | | | |
|---|---|---|---|
| 951,718 | 3/1910 | Arnsdorff | 242—86.52 |
| 1,485,587 | 3/1924 | Best | 242—86.52 |
| 2,536,571 | 1/1951 | Sanguin et al. | 242—86.52 |

NATHAN L. MINTZ, Primary Examiner